United States Patent [19]
> Lembeck et al.

[11] 4,395,355

[45] Jul. 26, 1983

[54] PROCESS AND APPARATUS FOR TREATING A PRESSURIZED FEED STREAM CAPABLE OF UNDERGOING AN ENDOTHERMIC REACTION

[75] Inventors: Manfred Lembeck, Buch; Patrick W. Kinsella, Wolfratshausen; Allan M. Watson, Ottobrunn, all of Fed. Rep. of Germany

[73] Assignee: Linde Aktiengesellschaft, Fed. Rep. of Germany

[21] Appl. No.: 264,000

[22] Filed: May 15, 1981

[30] Foreign Application Priority Data

Jun. 20, 1980 [DE]  Fed. Rep. of Germany ....... 3023170

[51] Int. Cl.$^3$ .......................... C01B 3/32; C01B 3/48
[52] U.S. Cl. .................................... 252/373; 423/655; 423/644; 55/74; 55/75; 518/704; 422/189
[58] Field of Search ................ 252/373; 423/650–655, 423/644

[56] References Cited

U.S. PATENT DOCUMENTS 2,946,754  7/1960  Peet ..................................... 252/373

*Primary Examiner*—Howard T. Mars
*Attorney, Agent, or Firm*—Lerner, David, Littenberg, Krumholz & Mentlik

[57] ABSTRACT

Processes and apparatus for treating a pressurized feed stream capable of undergoing an endothermic reaction are disclosed. The process includes dividing the feed stream and heating a portion of the feed stream in an endothermic reaction zone so as to produce an endothermic reaction product, subjecting that product to a secondary processing step which is favored by a reduction in temperature, expanding the other part of the feed stream, indirectly contacting the expanded portion of the feed stream thus produced with the endothermic reaction product in order to reduce the temperature of the endothermic reaction product and increase the temperature of the expanded portion of the feed stream, and utilizing the expanded portion of the feed stream as means for adding heat to the initial portion of the feed stream sent to the endothermic reaction zone.

1 Claim, 2 Drawing Figures

PROCESS AND APPARATUS FOR TREATING A PRESSURIZED FEED STREAM CAPABLE OF UNDERGOING AN ENDOTHERMIC REACTION

FIELD OF THE INVENTION

The present invention relates to processes and apparatus for the treatment of a pressurized feed stream which is to be subjected to an endothermic reaction. More particularly, the present invention relates to such processes and apparatus which include at least one further processing step, which is favored by a reduction in temperature.

BACKGROUND OF THE INVENTION

There are a number of technically important endothermic reactions, such as, for example, the production of synthesis gas by the steam reforming of hydrocarbons. These reactions are generally carried out in complex processes, which provide for a large number of individual processing steps. Since the optimal processing conditions, such as pressure or temperature, often deviate greatly from one of the individual process steps to another, it is frequently necessary in practice to carry out the individual process steps under less advantageous conditions, primarily because an optimization of each individual processing step would not result in an optimization of the process as a whole.

A number of such processing steps, such as the adsorptive purification or compression of a gas, are favored by cooling the gas stream. It is therefore an object of the present invention to provide a process of the type mentioned above in which the process conditions for such processing steps which are favored by a reduction in temperature are improved without having to spend additional energy for this purpose.

SUMMARY OF THE INVENTION

In accordance with the present invention, these and other objects have now been accomplished by subdividing the feed stream into at least two partial streams, one of which is supplied to the endothermic reaction zone for reaction therein, and the other of which is expanded, thereby reducing its temperature, is then subjected to indirect heat exchange with the stream which is supplied to the processing step which is favored by a reduction in temperature, and is then supplied to the endothermic reaction step as fuel.

In accordance with the process of the present invention for treating a pressurized feed stream capable of undergoing an endothermic reaction, the process includes dividing the feed stream into first and second feed streams, heating the first feed stream in an endothermic reaction zone so as to cause the endothermic reaction to occur and to produce an endothermic reaction product therein, subjecting the endothermic reaction product to a secondary processing step which is favored by a reduction in temperature, expanding the second feed stream so as to produce an expanded second feed stream of reduced pressure and temperature, indirectly contacting the expanded second feed stream with the endothermic reaction product stream so as to reduce the temperature of the endothermic reaction product and increase the temperature of the expanded second feed stream, and utilizing the expanded second feed stream having an increased temperature as means for adding heat to the first feed stream in the endothermic reaction zone.

In accordance with a preferred embodiment of the process of the present invention, the pressurized feed stream comprises a pressurized hydrocarbon stream, and the endothermic reaction which occurs in the endothermic reaction zone comprises steam reforming of the hydrocarbon stream.

Preferably, the secondary processing step is adsorptive purification, and where the endothermic reaction product is a gas the secondary processing step comprises compressing that gas.

In accordance with the apparatus of the present invention for treating a pressurized feed stream capable of undergoing an endothermic reaction, the apparatus includes dividing means for dividing the feed stream into first and second feed streams, an endothermic reaction zone, endothermic reaction zone feed means for feeding the first feed stream to the endothermic reaction zone, heating means for adding heat to the endothermic reaction zone whereby the first feed stream undergoes the endothermic reaction in the endothermic reaction zone so as to produce an endothermic reaction product therein, a secondary processing zone in which the endothermic reaction product may be subjected to a secondary processing step which is favored by a reduction in temperature, passage means for passing the endothermic reaction product to the secondary processing zone, expansion means for expanding the second feed stream so as to produce an expanded second feed stream having a reduced pressure and temperature, temperature reduction means for reducing the temperature in the secondary processing zone so as to favor the secondary processing step taking place therein, said temperature reduction means comprising indirect contact means for indirectly contacting the expanded second feed stream with the endothermic reaction product so as to reduce the temperature of the endothermic reaction product and increase the temperature of the expanded second feed stream, and transfer means for transferring the expanded second feed stream having an increased temperature to the heating means.

In accordance with a preferred embodiment of the apparatus of the present invention, the secondary processing zone comprises pressure swing adsorbers, or it may comprise a compressor.

With regard to the process of the present invention, in many cases it is important that the pressurized feed stream be available at the limits of the plant while, on the other hand, the energy which is required for the endothermic reaction is generated by the combustion of a suitable energy carrier at low pressures. In accordance with this invention, however, a partial stream produced from the feed stream is used for such combustion, thus making it necessary to expand this partial stream. The refrigeration obtain by this expansion is transferred in a heat exchanger to the stream which is to be subsequently treated in the processing step which is favored by a reduction in temperature. This method of conducting the process of this invention not only has the advantage of improving the processing conditions in this subsequent processing step, but it also results in the desirable heating of the feed material which is to be combusted, whereby condensation of the liquid in the burner can be prevented.

BRIEF DESCRIPTION OF THE DRAWINGS

Further details of the invention are explained below by means of two examples of the operation, which are shown schematically in the Figures, in which.

DETAILED DESCRIPTION

Figure 1:
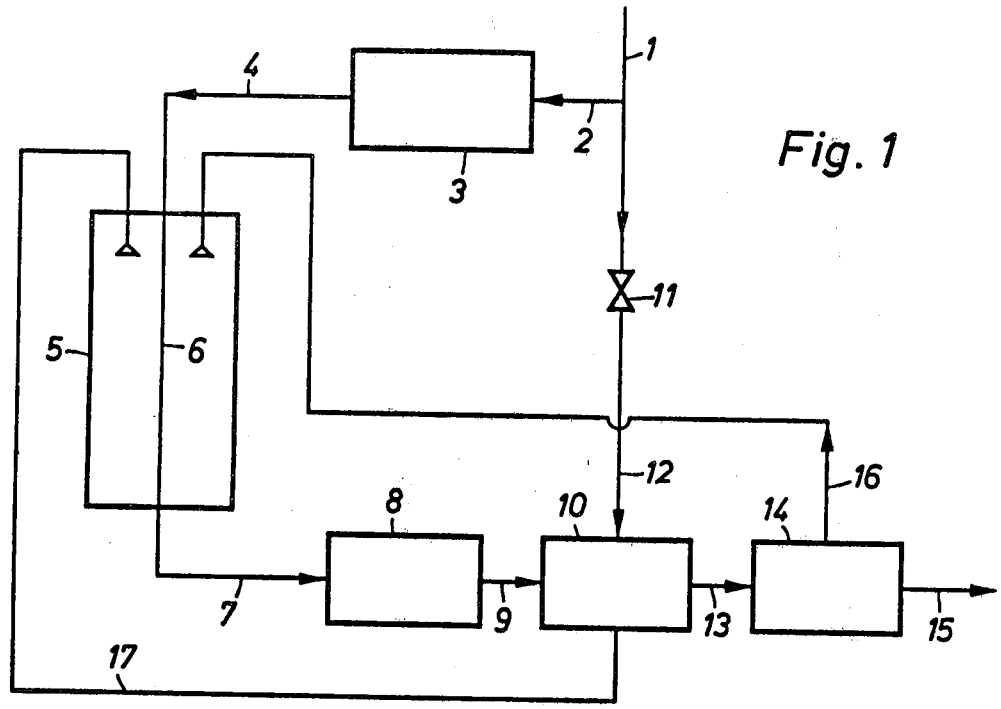
FIG. 1 is a schematic representation of a process in accordance with the present invention for the steam-reforming of hydrocarbons with subsequent adsorptive purification.

In the block diagram shown in FIG. 1, a feed stream, consisting essentially of butane, is supplied through pipeline 1 under a pressure of 30 bar and a temperature of 30° C. The main stream of this feed is pre-heated via pipeline 2 initially at 3, desulfurized and mixed with water. Subsequently, this mixture passes through pipeline 4 into a reforming furnace (endothermic reaction zone) 5 and, as it flows through the externally heated pipes 6, is converted into synthesis gas, which consists essentially of hydrogen and carbon oxides, and which is drawn off through pipeline 7. In a subsequent processing step 8, the synthesis gas initially enters a waste-heat system in which it is cooled, for example with the production of steam, and then passes through a converting step in which the carbon monoxide content is reduced by reaction with steam with the formation of additional hydrogen. After further cooling, the crude gas finally emerges from processing step 8, passes through pipeline 9 and is cooled further in an additional heat exchanger 10 against a partial stream 12 of feed stream 1, which has been expanded at 11, before it is supplied through line 13 to the pressure-swing adsorption plant 14.

The pressure-swing adsorption plant 14 consists of a plurality of adsorbers, which are operated in a conventional manner, in an adsorption phase and a desorption or regeneration phase. During an adsorption phase, purified hydrogen emerges from an adsorber and is given off through pipeline 15 as the product stream. A flushing gas, which results from the regeneration, and which contains the components bound during an adsorption phase, is drawn off through pipeline 16 and is used for heating the reforming furnace 5.

The partial stream 12, which is diverted from the feed stream 1, is expanded in valve 11 from 30 bar to approximately atmospheric pressure and, in so doing, cooled to about 10° C. The heat which is lost during this expansion is extracted in heat exchanger 10 from the product gas supplied to the pressure-swing adsorption plant 14, as a result of which there is an improvement in the adsorption conditions which are formed by these reduced temperatures. The partial stream 12 is again heated in heat exchanger 10 to 20° C., and is then supplied through pipeline 17 as fuel for the reforming furnace 5. In the case of a partial stream of 1000 kg/hour, which is required for firing the reforming furnace, a cooling capacity of 315,000kJ/hour is obtained in heat exchanger 10.

Figure 2:
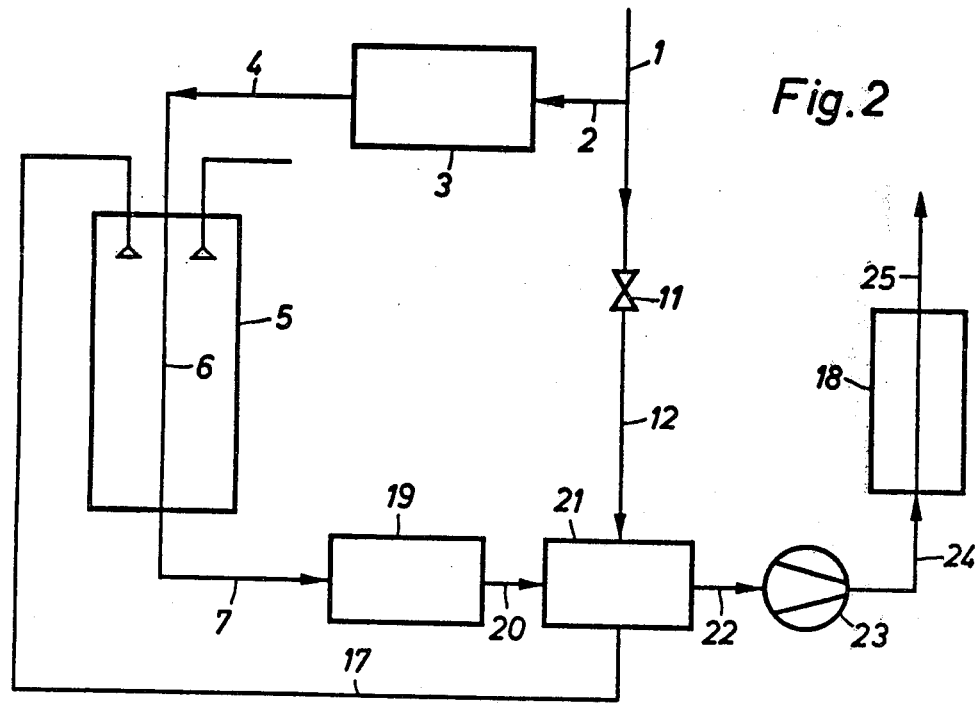
FIG. 2 is a schematic representation of another process of the present invention, in this case a high-pressure synthesis process.

The block diagram shown in FIG. 2 relates to a high-pressure synthesis process, such as the synthesis of methanol or ammonia. In order to be able to carry out a high-pressure synthesis in reactor 18, it is first of all necessary to prepare a suitable feed mixture. For this purpose, a hydrocarbon stream is supplied through pipelines 1 and 2, corresponding to the process of FIG. 1 and, after a pre-treatment 3, reaction in the pipes 6 of a stream reformer 5 (endothermic reaction zone). The product gas, which is drawn off through pipeline 7, is then cooled and purified. Optionally, its composition can also be modified, i.e., it is worked up in processing step 19 according to the requirements of the high-pressure synthesis. Subsequently, it enters heat exchanger 21 through pipeline 20 and, is cooled further here against the expanded partial stream 12 of feed stream 1. Through pipeline 22, this modified product gas then reaches compressor 23 and subsequently, through pipeline 24, reactor 18, for the high-pressure synthesis. The product steam is drawn off through pipeline 25, and can then be worked up in the conventional manner.

The energy which is required for heating in reforming furnace 5, can be totally or partially obtained by burning the partial stream 12 of feed stream 1, which has been expanded in valve 11 and pre-heated in heat exchanger 21. Residue streams, obtained in the process, may optionally also be introduced through pipeline 26, as may externally supplied fuels.

Obviously, the inventive process may also be used when the partial stream, which is to be used as fuel, is not diverted from the feed stream but supplied to the plant separately, provided only that is is available under pressure.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. A process for reforming a pressurized hydrocarbon feed stream comprising dividing said hydrocarbon feed stream into a first hydrocarbon feed stream and a second hydrocarbon feed stream, heating said first hydrocarbon feed stream in a reforming reaction zone so as to cause said reforming reaction to occur and to produce a reforming reaction product, expanding said second hydrocarbon feed stream so as to produce an expanded second hydrocarbon feed stream of reduced pressure and temperature, indirectly contacting said expanded second hydrocarbon feed stream with said reforming reaction product so as to reduce the temperature of said reforming reaction product and increase the temperature of said expanded second hydrocarbon feed stream, and utilizing said expanded second hydrocarbon feed stream having an increased temperature as a fuel for supplying heat to said first hydrocarbon feed stream in said reforming reaction zone.

* * * * *